(12) United States Patent
Fujimoto et al.

(10) Patent No.: US 10,741,865 B2
(45) Date of Patent: Aug. 11, 2020

(54) FLOW BATTERY HAVING ELECTRODE IMMERSED IN LIQUID WITH DISSOLVED LITHIUM

(71) Applicant: Panasonic Intellectual Property Management Co., Ltd., Osaka (JP)

(72) Inventors: Masahisa Fujimoto, Osaka (JP); Shuji Ito, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 99 days.

(21) Appl. No.: 15/636,642

(22) Filed: Jun. 29, 2017

(65) Prior Publication Data

US 2018/0026293 A1     Jan. 25, 2018

(30) Foreign Application Priority Data

Jul. 19, 2016    (JP) ................................ 2016-141439

(51) Int. Cl.
| | | |
|---|---|---|
| *H01M 8/18* | (2006.01) | |
| *H01M 8/04186* | (2016.01) | |
| *H01M 8/04082* | (2016.01) | |

(52) U.S. Cl.
CPC ....... *H01M 8/188* (2013.01); *H01M 8/04186* (2013.01); *H01M 8/04201* (2013.01); *H01M 8/04197* (2016.02); *H01M 8/186* (2013.01); *Y02E 60/528* (2013.01)

(58) Field of Classification Search
CPC ............. H01M 8/188; H01M 8/04186; H01M 8/04201; H01M 8/04197; H01M 8/186

USPC ........................................ 429/101, 102, 105
See application file for complete search history.

(56) References Cited

U.S. PATENT DOCUMENTS

| | | | | |
|---|---|---|---|---|
| 2010/0141211 | A1* | 6/2010 | Yazami ................. | H01M 4/368 320/127 |
| 2012/0135278 | A1 | 5/2012 | Yoshie et al. | |
| 2012/0171541 | A1* | 7/2012 | Park ...................... | H01M 8/188 429/107 |
| 2013/0004819 | A1* | 1/2013 | Mun ..................... | H01M 8/188 429/106 |

(Continued)

FOREIGN PATENT DOCUMENTS

WO     2010/143634     12/2010

OTHER PUBLICATIONS

Tan et al., Synthesis and Characterization of Biphenyl-Based Lithium Solvated Electron Solutions, 2012, The Journal of Physical Chemistry B, 116, 9056-9060 (Year: 2012).*

(Continued)

*Primary Examiner* — Sean P Cullen
(74) *Attorney, Agent, or Firm* — McDermott Will & Emery LLP

(57) ABSTRACT

A flow battery includes a first liquid, a second liquid, a first electrode immersed in the first liquid, a second electrode being a counter electrode of the first electrode and immersed in the second liquid, and an isolation unit separating the first electrode and the first liquid from the second electrode and the second liquid. Lithium is dissolved in at least one of the first liquid and the second liquid. The first liquid and the second liquid have a property of emitting solvated electrons of lithium and dissolving the lithium as a cation.

23 Claims, 13 Drawing Sheets

(56) References Cited

U.S. PATENT DOCUMENTS

| | | | | |
|---|---|---|---|---|
| 2013/0224538 A1* | 8/2013 | Jansen | ............... | H01M 8/188 |
| | | | | 429/72 |
| 2013/0224550 A1* | 8/2013 | Bugga | ............... | H01M 8/188 |
| | | | | 429/105 |
| 2013/0344416 A1* | 12/2013 | Sakamoto | ............ | H01M 10/052 |
| | | | | 429/495 |
| 2015/0147620 A1* | 5/2015 | Lee | ................ | H01M 8/0206 |
| | | | | 429/105 |
| 2015/0255803 A1* | 9/2015 | Delnick | ............ | H01M 8/188 |
| | | | | 429/498 |
| 2015/0333353 A1* | 11/2015 | Yazami | ............. | H01M 8/188 |
| | | | | 429/485 |
| 2017/0062863 A1* | 3/2017 | Huang | ............... | H01M 8/188 |

OTHER PUBLICATIONS

Lim et al., Synthesis and assessment of new cyclopenta-2,4-dienone derivatives for energy storage applications, Jan. 6, 2015, Synthetic Metals, 200, 85-90 (Year: 2015).*

\* cited by examiner

FIG. 2

| COMPOUND | MOLAR CONCENTRATION (M) | POTENTIAL (V vs. Li/Li+) |
|---|---|---|
| PHENANTHRENE | 1 | 0.03 |
| BIPHENYL | 1 | 0 |
| O-TERPHENYL | 1 | 0.15 |
| 2,2'-BIPYRIDYL | 1 | 0.4 |
| TRANS-STILBENE | 0.5 | 0.3 |
| TRIPHENYLENE | 0.1 | 0.01 |
| ANTHRACENE | 0.1 | 0.05 |

FIG. 3

| COMPOUND | MOLAR CONCENTRATION (M) | POTENTIAL (V vs. Li/Li+) |
|---|---|---|
| BENZOPHENONE | 1 | 0.78 |
| PHENANTHROLINE | 0.1 | 1.78 |

FIG. 6

| COMPOUND | MOLAR CONCENTRATION (M) | POTENTIAL (V vs. Li/Li⁺) |
|---|---|---|
| 4,4'-BIPYRIDYL | 0.1 | 1.22 |
| 3,3'-BIPYRIDYL | 0.1 | 2.5 |
| 2,4'-BIPYRIDYL | 0.1 | 0.54 |
| 2,3'-BIPYRIDYL | 0.1 | 0.58 |
| CIS-STILBENE | 0.1 | 0.43 |
| ACETOPHENONE | 0.1 | 1.29 |
| PROPIOPHENONE | 0.1 | 0.42 |
| BUTYROPHENONE | 0.1 | 0.3 |
| VALEROPHENONE | 0.1 | 0.31 |
| ETHYLENEDIAMINE | 0.1 | 0.36 |

FIG. 7

| COMPOUND | MOLAR CONCENTRATION (M) | POTENTIAL (V vs. Li/Li⁺) |
|---|---|---|
| ACENAPHTHENE | 0.1 | 0.016 |
| ACENAPHTHYLENE | 0.1 | 0.014 |
| FLUORANTHENE | 0.1 | 0.014 |

FIG. 8

| COMPOUND | MOLAR CONCENTRATION (M) | POTENTIAL (V vs. Li/Li⁺) |
|---|---|---|
| BENZIL | 0.1 | 0.16 |
| TETRAPHENYL-CYCLOPENTADIENONE | 0.1 | 0.34 |

FIG. 9

| SAMPLE NAME | BIPHENYL CONCENTRATION [M] | LiBF$_4$ CONCENTRATION [M] | POTENTIAL [V vs. (Li/Li$^+$)] |
|---|---|---|---|
| SAMPLE A1 | 0.1 | 1 | 1.2 |
| SAMPLE A2 | 0.1 | 0.7 | 1.1 |
| SAMPLE A3 | 0.1 | 0.5 | 0.87 |
| SAMPLE A4 | 0.1 | 0.2 | 0.21 |
| SAMPLE A5 | 0.1 | 0.1 | 0.006 |
| SAMPLE A6 | 0.1 | 0.05 | 0.003 |
| SAMPLE A7 | 0.1 | 0.025 | 0.003 |
| SAMPLE A8 | 0.1 | 0 | 0.002 |
| SAMPLE A9 | 1 | 1 | 0.004 |
| SAMPLE A10 | 1 | 0.5 | 0 |
| SAMPLE A11 | 1 | 0.1 | 0 |

FIG. 10

| SAMPLE NAME | BIPHENYL CONCENTRATION [M] | LiN(SO$_2$CF$_3$)$_2$ CONCENTRATION [M] | POTENTIAL [V vs. (Li/Li$^+$)] |
|---|---|---|---|
| SAMPLE B1 | 0.1 | 0.5 | 1.95 |
| SAMPLE B2 | 0.1 | 0.1 | 0.007 |
| SAMPLE B3 | 0.1 | 0.05 | 0.003 |
| SAMPLE B4 | 0.1 | 0.0 | 0 |

FIG. 11

| SAMPLE NAME | BIPHENYL CONCENTRATION [M] | LiN(SO$_2$F)$_2$ CONCENTRATION [M] | POTENTIAL [V vs. (Li/Li$^+$)] |
|---|---|---|---|
| SAMPLE C1 | 0.1 | 0.5 | 2.5 |
| SAMPLE C2 | 0.1 | 0.1 | 0.17 |
| SAMPLE C3 | 0.1 | 0.05 | 0.08 |
| SAMPLE C4 | 0.1 | 0.0 | 0 |

FIG. 12

| SAMPLE NAME | BIPHENYL CONCENTRATION [M] | LiCF$_3$SO$_3$ CONCENTRATION [M] | POTENTIAL [V vs. (Li/Li$^+$)] |
|---|---|---|---|
| SAMPLE D1 | 0.1 | 0.5 | 0.78 |
| SAMPLE D2 | 0.1 | 0.1 | 0.002 |
| SAMPLE D3 | 0.1 | 0.05 | 0.002 |
| SAMPLE D4 | 0.1 | 0.0 | 0 |

FIG. 13

| SAMPLE NAME | TRANS-STILBENE CONCENTRATION [M] | $LiBF_4$ CONCENTRATION [M] | POTENTIAL [V vs. (Li/Li$^+$)] |
|---|---|---|---|
| SAMPLE E1 | 0.1 | 1 | 1.32 |
| SAMPLE E2 | 0.1 | 0.4 | 1.28 |
| SAMPLE E3 | 0.1 | 0.2 | 1.0 |
| SAMPLE E4 | 0.1 | 0.1 | 0.42 |
| SAMPLE E5 | 0.1 | 0.05 | 0.33 |
| SAMPLE E6 | 0.1 | 0 | 0.3 |
| SAMPLE E7 | 0.4 | 0.4 | 0.56 |
| SAMPLE E8 | 0.4 | 0.2 | 0.28 |
| SAMPLE E9 | 0.4 | 0.1 | 0.25 |

FIG. 14

| SAMPLE NAME | BIPHENYL CONCENTRATION [M] | LiPF$_6$ CONCENTRATION [M] | POTENTIAL [V vs. (Li/Li$^+$)] |
|---|---|---|---|
| SAMPLE F1 | 0.1 | 1 | 0.001 |
| SAMPLE F2 | 0.1 | 0.5 | 0.000 |
| SAMPLE F3 | 0.1 | 0.1 | 0.006 |
| SAMPLE F4 | 0.1 | 0.05 | 0.009 |
| SAMPLE F5 | 0.1 | 0.0 | 0 |

FIG. 15

| SAMPLE NAME | TRANS-STILBENE CONCENTRATION [M] | LiPF$_6$ CONCENTRATION [M] | POTENTIAL [V vs. (Li/Li$^+$)] |
|---|---|---|---|
| SAMPLE G1 | 0.1 | 1 | 0.29 |
| SAMPLE G2 | 0.1 | 0.5 | 0.26 |
| SAMPLE G3 | 0.1 | 0.1 | 0.25 |
| SAMPLE G4 | 0.1 | 0.05 | 0.24 |
| SAMPLE G5 | 0.1 | 0.0 | 0.3 |

FIG. 16

| SAMPLE NAME | SOLVENT | SOLUBILITY OF LITHIUM METAL |
|---|---|---|
| SAMPLE S-A1 | TETRAHYDROFURAN | ○ |
| SAMPLE S-A2 | 2-METHYL-TETRAHYDROFURAN | ○ |
| SAMPLE S-A3 | 1,2-DIMETHOXYETHANE | ○ |
| SAMPLE S-A4 | 2,5-DIMETHYLTETRAHYDROFURAN | ○ |
| SAMPLE S-A5 | DIETHOXYETHANE | ○ |
| SAMPLE S-A6 | DIBUTOXYETHANE | ○ |
| SAMPLE S-A7 | DIETHYLENE GLYCOL DIMETHYL ETHER | ○ |
| SAMPLE S-A8 | TRIETHYLENE GLYCOL DIMETHYL ETHER | ○ |
| SAMPLE S-A9 | TETRAETHYLENE GLYCOL DIMETHYL ETHER | ○ |
| SAMPLE S-A10 | DIETHYLENE GLYCOL ETHYLMETHYL ETHER | ○ |
| SAMPLE S-A11 | 3-METHYLSULFOLANE | ○ |
| SAMPLE S-A12 | TETRAHYDROFURFURYLAMINE | ○ |
| SAMPLE S-A13 | 2-METHYLTETRAHYDROFURAN-3-ONE | × |
| SAMPLE S-A14 | TETRAHYDROFURFURYL BUTYRATE | × |
| SAMPLE S-A15 | DIPHENYL ETHER | × |
| SAMPLE S-A16 | VINYLENE CARBONATE | × |
| SAMPLE S-A17 | DIBUTOXYMETHANE | × |
| SAMPLE S-A18 | ANISOLE | × |
| SAMPLE S-A19 | PHENETOLE | × |
| SAMPLE S-A20 | 2,5-DIMETHOXYTETRAHYDROFURAN | × |

FIG. 17

| SAMPLE NAME | SOLVENT X | SOLVENT Y | VOLUME MIXING RATIO | SOLUBILITY OF LITHIUM METAL |
|---|---|---|---|---|
| SAMPLE S-B1 | DIBUTOXYETHANE | 2-METHYL-TETRAHYDROFURAN | 3:7 | ○ |
| SAMPLE S-B2 | DIBUTOXYETHANE | 2-METHYL-TETRAHYDROFURAN | 2:8 | ○ |
| SAMPLE S-B3 | DIBUTOXYETHANE | 2,5-DIMETHOXYTETRAHYDROFURAN | 3:7 | ○ |
| SAMPLE S-B4 | DIBUTOXYETHANE | 2,5-DIMETHOXYTETRAHYDROFURAN | 2:8 | ○ |
| SAMPLE S-B5 | DIBUTOXYETHANE | DIBUTOXYETHANE | 2:8 | ○ |
| SAMPLE S-B6 | ANISOLE | DIBUTOXYETHANE | 2:8 | ○ |
| SAMPLE S-B7 | PHENETOLE | DIBUTOXYETHANE | 2:8 | ○ |
| SAMPLE S-B8 | 2,5-DIMETHOXYTETRAHYDROFURAN | DIETHYLENE GLYCOL DIBUTYL ETHER | 2:8 | ○ |
| SAMPLE S-B9 | 3-METHYLSULFOLANE | DIETHYLENE GLYCOL DIBUTYL ETHER | 2:8 | ○ |

FLOW BATTERY HAVING ELECTRODE IMMERSED IN LIQUID WITH DISSOLVED LITHIUM

BACKGROUND

1. Technical Field

The present disclosure relates to a flow battery.

2. Description of the Related Art

Japanese Patent No. 5417441 discloses a redox flow battery using a negative electrode solution in a slurry form containing negative electrode active material particles of solid metal particles and a nonaqueous solvent.

SUMMARY

In known technologies, it is desired to realize a high energy density flow battery.

In one general aspect, the techniques disclosed here feature a flow battery including a first liquid, a second liquid, a first electrode immersed in the first liquid, a second electrode being a counter electrode of the first electrode and immersed in the second liquid, and an isolation unit separating the first electrode and the first liquid from the second electrode and the second liquid. Lithium is dissolved in at least one of the first liquid and the second liquid. The first liquid and the second liquid have a property of emitting solvated electrons of lithium and dissolving the lithium as a cation.

The present disclosure can realize a high energy density flow battery.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2 shows the results of measurement of the potentials of condensed aromatic compounds that can be used as the first condensed aromatic compound 111;

FIG. 3 shows the results of measurement of the potentials of condensed aromatic compounds that can be used as the second condensed aromatic compound 121;

FIG. 6 shows the results of measurement of the potentials of condensed aromatic compounds;

FIG. 7 shows the results of measurement of the potentials of condensed aromatic compounds;

FIG. 8 shows the results of measurement of the potentials of condensed aromatic compounds;

FIG. 9 shows the results of measurement of the potentials of biphenyl solutions;

FIG. 10 shows the results of measurement of the potentials of biphenyl solutions;

FIG. 11 shows the results of measurement of the potentials of biphenyl solutions;

FIG. 12 shows the results of measurement of the potentials of biphenyl solutions;

FIG. 13 shows the results of measurement of the potentials of trans-stilbene solutions;

FIG. 14 shows the results of measurement of the potentials of biphenyl solutions;

FIG. 15 shows the results of measurement of the potentials of trans-stilbene solutions;

FIG. 16 shows samples of the first liquid; and

FIG. 17 shows other samples of the first liquid.

DETAILED DESCRIPTION

Embodiments of the present disclosure will now be described with reference to the drawings.

Embodiment 1

Figure 1:
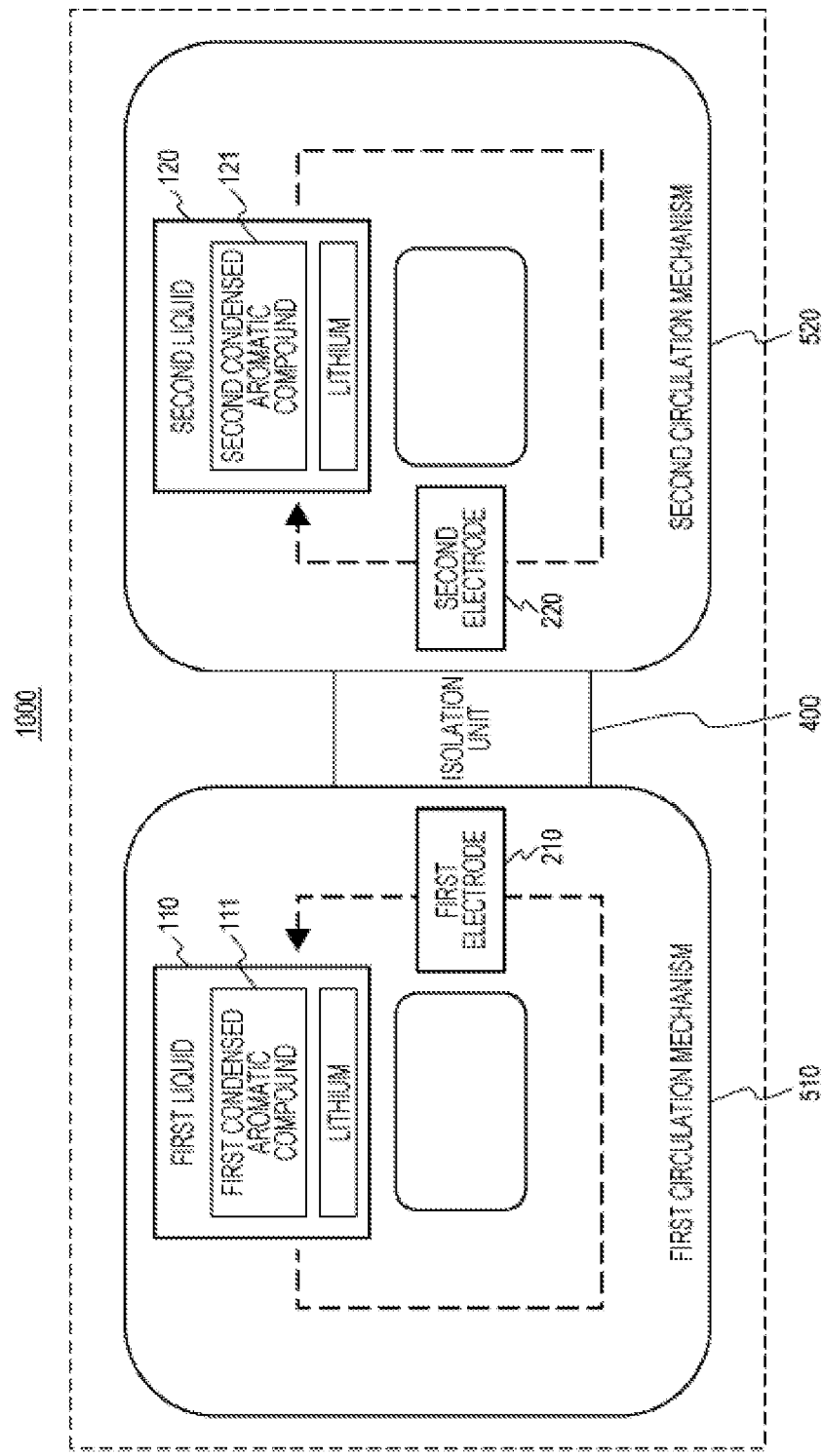
FIG. 1 is a block diagram illustrating the schematic constitution of a flow battery 1000 according to Embodiment 1.

FIG. 1 is a block diagram illustrating the schematic constitution of a flow battery 1000 according to Embodiment 1.

The flow battery 1000 of Embodiment 1 includes a first liquid 110; a second liquid 120, a first electrode 210, a second electrode 220, and an isolation unit 400.

The first electrode 210 is immersed in the first liquid 110.

The second electrode 220 is a counter electrode of the first electrode 210 and is immersed in the second liquid 120.

The isolation unit 400 separates the first electrode 210 and the first liquid 110 from the second electrode 220 and the second liquid 120.

Lithium is dissolved in at least one of the first liquid 110 and the second liquid 120.

The first liquid 110 and the second liquid 120 have a property of emitting solvated electrons of lithium and dissolving the lithium as a cation.

The above-described constitution can realize a flow battery having both a high energy density and a long cycle life.

That is, the above-described constitution allows lithium to be dissolved in both the first liquid 110 and the second liquid 120. As a result, a larger amount of lithium can be dissolved. Consequently, a high energy density and a high capacitance can be realized.

The above-described constitution circulates the first liquid 110 and the second liquid 120 and therefore does not require, for example, circulation of a powdered active material. Consequently, for example, clogging of the pipe due to the powdered active material can be prevented from occurring. Accordingly, a flow battery having a long cycle life can be realized.

In the flow battery 1000 of Embodiment 1, the isolation unit 400 may include a diaphragm of a lithium-ion conductive solid electrolyte.

In such a case, the diaphragm of the solid electrolyte included in the isolation unit 400 may be of a sintered compact of a solid electrolyte having a composition represented by $Li_7La_3Zr_2O_{12}$.

The above-described constitution can realize a diaphragm that has higher lithium-ion conductivity and also does not react with lithium and a solution in which lithium is dissolved (i.e., the first liquid 110 and the second liquid 120). Consequently, an isolation unit 400 that stably functions, for example, without being reduced even at a base potential (in other words, highly resistant to reduction) can be realized.

The LLZ sintered compact (i.e., a sintered compact of a solid electrolyte having a composition represented by Li$_7$La$_3$Zr$_2$O$_{12}$) has high lithium-ion conductivity comparable to that of the lithium aluminum titanium phosphate (LATP) solid electrolyte.

In the flow battery 1000 of Embodiment 1, a first condensed aromatic compound 111 may be dissolved in the first liquid 110.

The first liquid 110 in which the first condensed aromatic compound 111 is dissolved has a property of emitting solvated electrons of lithium and dissolving the lithium as a cation.

In the above-described constitution, the first liquid 110 can dissolve a larger amount of lithium by means of the first condensed aromatic compound 111. Consequently, a higher energy density and a higher capacitance can be realized.

In the flow battery 1000 of Embodiment 1, the first condensed aromatic compound 111 may be reduced on the first electrode 210 during charging of the flow battery 1000 (i.e., in the state supplying electrons from the outside of the flow battery 1000 to the first electrode 210).

In contrast, during discharging of the flow battery 1000 (i.e., in the state emitting electrons from the first electrode 210 to the outside of the flow battery 1000), the first condensed aromatic compound 111 may be oxidized on the first electrode 210.

In the above-described constitution, a larger amount of lithium can be dissolved in the first liquid 110 during charging, and also a larger number of lithium ions can be generated from the first liquid 110 during discharging. Consequently, the capacitance of charge and discharge can be increased.

For example, when the first liquid 110 is brought into contact with the first electrode 210, the first condensed aromatic compound 111 is oxidized or reduced by the first electrode 210.

In the flow battery 1000 of Embodiment 1, the first condensed aromatic compound 111 may be at least one selected from the group consisting of phenanthrene, biphenyl, O-terphenyl, 2,2'-bipyridyl, trans-stilbene, triphenylene, and anthracene.

The above-described constitution can realize a first liquid 110 in which a first condensed aromatic compound 111 having potentially base properties is dissolved. More specifically, the first condensed aromatic compound 111 can have a relatively low equilibrium potential (vs. Li/Li$^+$). Consequently, a lower potential negative electrode of a flow battery can be realized. Thus, a flow battery having a high battery voltage (discharge voltage) can be realized.

A solution (e.g., ether solution) containing a condensed aromatic compound has ability of dissolving lithium (e.g., lithium metal). Lithium readily releases an electron to become a cation. Accordingly, lithium transfers an electron to the condensed aromatic compound in the solution to become a cation and is thus dissolved in the solution. On this occasion, the electron-received condensed aromatic compound solvates with the electron. The condensed aromatic compound behaves as an anion by solvating with an electron. Accordingly, the condensed aromatic compound-containing solution itself has ion conductivity. In this condensed aromatic compound-containing solution, Li cations and electrons are present in equivalent amounts. Therefore, the condensed aromatic compound-containing solution itself can have strong reducing (in other words, potentially base) properties.

For example, when an electrode not reacting with lithium is immersed in a solution containing a condensed aromatic compound and when the potential with respect to lithium metal is measured, a considerably base potential is observed.

The potential to be observed is determined based on the degree of solvation of the condensed aromatic compound with electrons (i.e., the type of the condensed aromatic compound).

FIG. 2 shows the results of measurement of the potentials of condensed aromatic compounds that can be used as the first condensed aromatic compound 111.

Copper foil of 2 cm×2 cm in size was wrapped with a polypropylene microporous separator and was further wrapped with a large amount of lithium metal foil. Tabs were then attached to the copper foil and the lithium metal foil, and a laminate outer package was further attached thereto. 2-Methyl tetrahydrofuran (2-MeTHF) in which a condensed aromatic compound was dissolved at the molar concentration (M) shown in FIG. 2 was poured inside the laminate outer package, and the laminate outer package was then heat-sealed. As described above, a cell for potential measurement was produced for each condensed aromatic compound. FIG. 2 shows the potentials (V vs. Li/Li$^+$) measured based on the lithium metal for the cells for potential measurement. Although 2-MeTHF was used as the ether in this measurement, other ethers can be similarly used.

As shown in FIG. 2, examples of the condensed aromatic compound producing a base potential include phenanthrene, biphenyl, O-terphenyl, 2,2'-bipyridyl, trans-stilbene, triphenylene, and anthracene.

These condensed aromatic compounds have a solubility of about several moles per liter and therefore can provide a high capacitance density and a high battery voltage. Consequently, the energy density of the flow battery can be increased.

In the flow battery 1000 of Embodiment 1, the first liquid 110 may be an ether solution.

The above-described constitution can realize an electrolytic solution containing a first condensed aromatic compound 111 as a first liquid 110. That is, although the solvent for the first condensed aromatic compound 111 is an ether solution not having electron conductivity, the ether solution itself can have properties as an electrolytic solution.

Examples of the ether that can be used as the first liquid 110 include tetrahydrofuran (THF), 2-methyltetrahydrofuran (2-MeTHF), dimethoxyethane (DME), 1,3-dioxane (1,3-DO), and 4-methyl-1,3-dioxane (4-Me-1,3-DO).

In the flow battery 1000 of Embodiment 1, a second condensed aromatic compound 121 may be dissolved in the second liquid 120.

The second liquid 120 containing the second condensed aromatic compound 121 has a property of emitting solvated electrons of lithium and dissolving the lithium as a cation.

In the above-described constitution, the second liquid 120 can dissolve a larger amount of lithium by means of the second condensed aromatic compound 121. Consequently, a higher energy density and a higher capacitance can be realized.

In the flow battery 1000 of Embodiment 1, the second condensed aromatic compound 121 may be oxidized on the second electrode 220 during charging of the flow battery 1000 (i.e., in the state emitting electrons from the second electrode 220 to the outside of the flow battery 1000).

The second condensed aromatic compound 121 may be reduced on the second electrode 220 during discharging of the flow battery 1000 (i.e., in the state supplying electrons from the outside of the flow battery 1000 to the second electrode 220).

In the above-described constitution, a larger number of lithium ions can be generated from the second liquid 120 during charging. In addition, during discharging, a larger amount of lithium can be dissolved in the second liquid 120. Consequently, the capacitance of charge and discharge can be increased.

For example, when the second liquid 120 is brought into contact with the second electrode 220, the second condensed aromatic compound 121 is oxidized or reduced by the second electrode 220.

In the flow battery 1000 of Embodiment 1, the second condensed aromatic compound 121 may be at least one selected from the group consisting of benzophenone and 1,10-phenanthroline.

The above-described constitution can realize a second liquid 120 in which a second condensed aromatic compound 121 having potentially noble properties is dissolved. More specifically, the second condensed aromatic compound 121 can have a relatively high equilibrium potential (vs. Li/Li$^+$), Consequently, a flow battery having a higher potential positive electrode can be realized, Consequently, a flow battery having a high battery voltage (discharge voltage) can be realized.

FIG. 3 shows the results of measurement of the potentials of condensed aromatic compounds that can be used as the second condensed aromatic compound 121.

Cells for potential measurement shown in FIG. 3 were produced in the same manner for those in FIG. 2 except that 2-MeTHF in which a condensed aromatic compound was dissolved at the molar concentration (M) shown in FIG. 3 was used as the lithium-containing liquid. FIG. 3 shows the potentials (V vs. Li/Li$^+$) measured based on the lithium metal for the cells for potential measurement.

As shown in FIG. 3, examples of the condensed aromatic compound producing a noble potential include benzophenone and 1,10-phenanthroline.

These condensed aromatic compounds have a solubility of about several moles per liter and therefore can provide a high capacitance density and a high battery voltage. Consequently, the energy density of the flow battery can be increased.

In particular, when the second condensed aromatic compound 121 is benzophenone or 1,10-phenanthroline and the first condensed aromatic compound 111 is biphenyl or phenanthrene, a battery voltage of about 0.78 to 1.78 V can be achieved.

In the flow battery 1000 of Embodiment 1, the second liquid 120 may be an ether solution.

The above-described constitution can realize an electrolytic solution containing a second condensed aromatic compound 121 as a second liquid 120. That is, although the solvent for the second condensed aromatic compound 121 is an ether solution not having electron conductivity, the ether solution itself can have properties as an electrolytic solution.

Examples of the ether that can be used as the second liquid 120 include tetrahydrofuran (THF), 2-methyltetrahydrofuran (2-MeTHF), dimethyl ether (DME), 1,3-dioxane (1,3-DO), and 4-methyl-1,3-dioxane (4-Me-1,3-DO).

The first liquid 110 and the second liquid 120 may be ether solutions containing the same ether or may be ether solutions containing different ethers.

In the flow battery 1000 of Embodiment 1, the first electrode 210 may be a negative electrode and the second electrode 220 may be a positive electrode.

Alternatively, the first electrode 210 can be a positive electrode by using an electrode with a relatively low potential as the second electrode 220.

That is, the first electrode 210 may be a positive electrode and the second electrode 220 may be a negative electrode.

The first electrode 210 may be an electrode having a surface that functions as a reaction field of the first condensed aromatic compound 111.

In this case, a material stable to the first liquid 110 can be used for the first electrode 210. Furthermore, a material stable to an electrochemical reaction, an electrode reaction, can be used for the first electrode 210. As the first electrode 210, for example, a metal (e.g., stainless steel, iron, copper, or nickel) or carbon can be used.

The first electrode 210 may have a structure (e.g., mesh, nonwoven, surface-roughened plate, or porous sintered compact) increasing the surface area. In such a case, the first electrode 210 has an enlarged specific surface area. Consequently, the oxidation reaction or reduction reaction of the first condensed aromatic compound 111 can more easily proceed.

The second electrode 220 may be an electrode having a surface that functions as a reaction field of the second condensed aromatic compound 121.

In this case, a material stable to the second liquid 120 can be used for the second electrode 220. Furthermore, a material stable to an electrochemical reaction, an electrode reaction, can be used for the second electrode 220. As the second electrode 220, for example, a metal (e.g., stainless steel, iron, copper, or nickel) or carbon can be used.

The second electrode 220 may have a structure (e.g., mesh, nonwoven, surface-roughened plate, or porous sintered compact) increasing the surface area. In such a case, the second electrode 220 has an enlarged specific surface area. Consequently, the oxidation reaction or reduction reaction of the second condensed aromatic compound 121 can more easily proceed.

The flow battery 1000 of Embodiment 1 may further include a first circulation mechanism 510 and a second circulation mechanism 520.

The first circulation mechanism 510 and the second circulation mechanism 520 may be, for example, a mechanism including a pipe, a tank, a pump, and a valve.

The structure of Embodiment 2 described below is an example of the first circulation mechanism 510 and the second circulation mechanism 520.

Explanation of Charge and Discharge Process

A charge and discharge process of the flow battery 1000 of Embodiment 1 will now be described.

Specifically, the charge and discharge process will be described with reference to an example operation of the following format.

That is, in this example operation, the first electrode 210 is a negative electrode and is made of stainless steel.

In this example operation, the first liquid 110 is an ether solution in which the first condensed aromatic compound 111 is dissolved.

In this operation example, the first condensed aromatic compound 111 is phenanthrene (hereinafter, referred to as PNT).

In this example operation, the second electrode 220 is a positive electrode and is made of stainless steel.

In this example operation, the second liquid 120 is an ether solution in which the second condensed aromatic compound 121 is dissolved.

In this example operation, the second condensed aromatic compound 121 is benzophenone (hereinafter, referred to as BP).

In this example operation, the isolation unit 400 is a lithium-ion conductive solid electrolyte film.

Explanation of Charge Process

First, a charge reaction will be described.

A voltage is applied between the first electrode 210 and the second electrode 220 to perform charging.

Reaction on Positive Electrode Side

On the second electrode 220 serving as a positive electrode, an oxidation reaction of the second condensed aromatic compound 121 is caused by application of a voltage. That is, the second condensed aromatic compound 121 is oxidized on the surface of the second electrode 220. Consequently, electrons are emitted from the second electrode 220 to the outside of the flow battery.

For example, in this example operation, the following reaction occurs:

$$BP.Li \rightarrow BP + Li^+ + e^-.$$

A part of the generated lithium ions ($Li^+$) can move to the first liquid 110 through the isolation unit 400.

Reaction on Negative Electrode Side

Application of a voltage supplies electrons from the outside of the flow battery to the first electrode 210 serving as a negative electrode. Consequently, a reduction reaction of the first condensed aromatic compound 111 occurs on the first electrode 210. That is, the first condensed aromatic compound 111 is reduced on the surface of the first electrode 210.

For example, in this example operation, the following reaction occurs:

$$PNT + Li^+ + e^- \rightarrow PNT.Li.$$

The charge reaction described above can proceed until the first liquid 110 reaches a fully charged state or the second liquid 120 reaches a fully charged state.

Explanation of Discharge Process

Secondly, a discharge reaction from full charge will be described.

In full charge, the first liquid 110 and the second liquid 120 are in charged states.

In the discharge reaction, power is taken out from between the first electrode 210 and the second electrode 220.

Reaction on Positive Electrode Side

Discharge of the battery supplies electrons from the outside of the flow battery to the second electrode 220 serving as the positive electrode. Consequently, a reduction reaction of the second condensed aromatic compound 121 occurs on the second electrode 220. That is, the second condensed aromatic compound 121 is reduced on the surface of the second electrode 220.

For example, in this example operation, the following reaction occurs:

$$BP + Li^+ + e^- \rightarrow BP.Li.$$

Reaction on Negative Electrode Side

Discharge of the battery causes an oxidation reaction of the first condensed aromatic compound 111 on the first electrode 210 serving as the negative electrode. That is, the first condensed aromatic compound 111 is oxidized on the surface of the first electrode 210. Consequently, electrons are emitted from the first electrode 210 to the outside of the flow battery.

For example, in this example operation, the following reaction occurs:

$$PNT.Li \rightarrow PNT + Li^+ + e^-.$$

The discharge reaction described above can proceed until the first liquid 110 reaches a fully discharged state or the second liquid 120 reaches a fully discharged state.

Embodiment 2

Embodiment 2 will now be described. Explanation overlapping with Embodiment 1 is omitted as appropriate.

Figure 4:
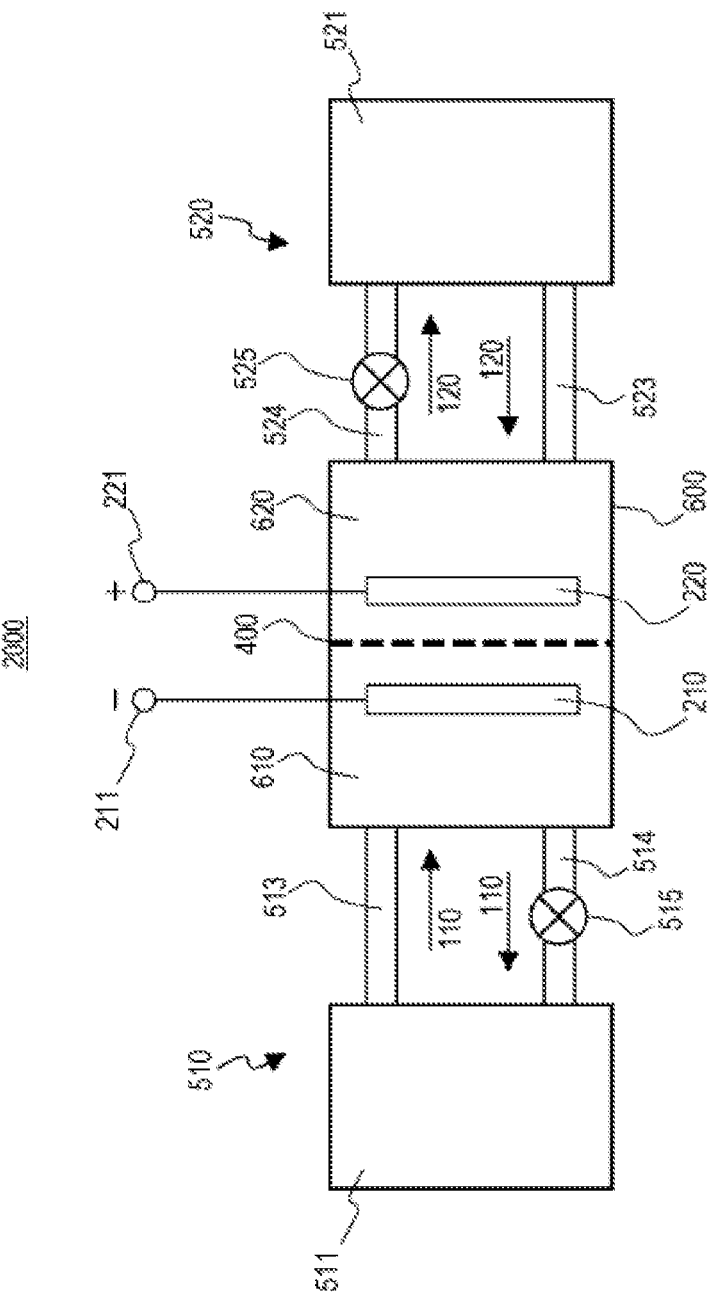
FIG. 4 is a diagram illustrating the schematic constitution of a flow battery 2000 according to Embodiment 2.

FIG. 4 is a diagram illustrating the schematic constitution of a flow battery 2000 according to Embodiment 2.

The flow battery 2000 of Embodiment 2 includes the following constitution in addition to the constitution of the flow battery 1000 of Embodiment 1.

That is, the flow battery 2000 of Embodiment 2 further includes a first circulation mechanism 510.

The first circulation mechanism 510 includes a first container 511.

The first liquid 110 is contained in the first container 511.

The first circulation mechanism 510 circulates the first liquid 110 between the first electrode 210 and the first container 511.

In the above-described constitution, the first container 511 can contain a large amount of the first liquid 110. Consequently, for example, a larger amount of the first liquid 110 can be supplied to the first electrode 210 within a shorter time. Consequently, the oxidation reaction and the reduction reaction of the first condensed aromatic compound 111 by the first electrode 210 can be more efficiently performed.

In Embodiment 2, the first container 511 may be, for example, a tank.

The first container 511 may contain, for example, the first liquid 110 in which the first condensed aromatic compound 111 is dissolved.

In addition, as shown in FIG. 4, the flow battery 2000 of Embodiment 2 may further include an electrochemical reaction unit 600, a positive electrode terminal 221, and a negative electrode terminal 211.

The electrochemical reaction unit 600 is separated into a negative electrode chamber 610 and a positive electrode chamber 620 by the isolation unit 400.

In the negative electrode chamber 610, an electrode (in the example show in FIG. 4, the first electrode 210) functioning as the negative electrode is disposed.

The negative electrode terminal 211 is connected to the electrode functioning as the negative electrode.

In the positive electrode chamber 620, an electrode (in the example shown in FIG. 4, the second electrode 220) functioning as the positive electrode is disposed.

The positive electrode terminal 221 is connected to the electrode functioning as the positive electrode.

The negative electrode terminal 211 and the positive electrode terminal 221 are connected to, for example, a charge and discharge device. The charge and discharge device applies a voltage between the negative electrode terminal 211 and the positive electrode terminal 221 or takes out power from between the negative electrode terminal 211 and the positive electrode terminal 221.

In addition, as shown in FIG. 4, in the flow battery 2000 of Embodiment 2, the first circulation mechanism 510 may include pipes 513 and 514 and a pump 515.

One end of the pipe 514 is connected to the negative electrode chamber 610 or positive electrode chamber 620 in which the first electrode 210 is disposed (in the example shown in FIG. 4, the negative electrode chamber 610).

The other end of the pipe 514 is connected to the first container 511 on the side of the inlet of the first liquid 110.

One end of the pipe 513 is connected to the first container 511 on the side of the outlet of the first liquid 110.

The other end of the pipe 513 is connected to the negative electrode chamber 610 or positive electrode chamber 620 in which the first electrode 210 is disposed (in the example shown in FIG. 4, the negative electrode chamber 610).

The pump 515 may be provided in, for example, the pipe 514. Alternatively, the pump 515 may be provided in the pipe 513.

In the example shown in FIG. 4, the first liquid 110 contained in the first container 511 passes through the pipe 513 and is then supplied to the negative electrode chamber 610.

Consequently, the first condensed aromatic compound 111 dissolved in the first liquid 110 is oxidized or reduced by the first electrode 210.

Subsequently, the first liquid 110 containing the oxidized or reduced first condensed aromatic compound 111 passes through the pipe 514 and the pump 515 and is then supplied to the first container 511.

The circulation of the first liquid 110 may be controlled by, for example, the pump 515. That is, the pump 515 appropriately starts the supply of the first liquid 110, or stops the supply, or controls, for example, the amount of the first liquid 110 to be supplied.

Alternatively, the circulation of the first liquid 110 may be controlled by a means (e.g., valve) other than the pump 515.

The flow battery 2000 of Embodiment 2 may further include a second circulation mechanism 520.

The second circulation mechanism 520 includes a second container 521.

The second liquid 120 is contained in the second container 521.

The second circulation mechanism 520 circulates the second liquid 120 between the second electrode 220 and the second container 521.

In the above-described constitution, the second container 521 can contain a large amount of the second liquid 120. Consequently, for example, a larger amount of the second liquid 120 can be supplied to the second electrode 220 within a shorter time. Consequently, the oxidation reaction and the reduction reaction of the second condensed aromatic compound 121 by the second electrode 220 can be more efficiently performed.

In Embodiment 2, the second container 521 may be, for example, a tank.

The second container 521 may contain, for example, the second liquid 120 in which the second condensed aromatic compound 121 is dissolved.

In addition, as shown in FIG. 4, in the flow battery 2000 of Embodiment 2, the second circulation mechanism 520 may include pipes 523 and 524 and a pump 525.

One end of the pipe 524 is connected to the positive electrode chamber 620 or negative electrode chamber 610 in which the second electrode 220 is disposed (in the example shown in FIG. 4, the positive electrode chamber 620).

The other end of the pipe 524 is connected to the second container 521 on the side of the inlet of the second liquid 120.

One end of the pipe 523 is connected to the second container 521 on the side of the outlet of the second liquid 120.

The other end of the pipe 523 is connected to the positive electrode chamber 620 or negative electrode chamber 610 in which the second electrode 220 is disposed (in the example shown in FIG. 4, the positive electrode chamber 620).

The pump 525 may be provided in, for example, the pipe 524. Alternatively, the pump 525 may be provided in the pipe 523.

In the example shown in FIG. 4, the second liquid 120 contained in the second container 521 passes through the pipe 523 and is then supplied to the positive electrode chamber 620.

Consequently, the second condensed aromatic compound 121 dissolved in the second liquid 120 is oxidized or reduced by the second electrode 220.

Subsequently, the second liquid 120 containing the oxidized or reduced second condensed aromatic compound 121 passes through the pipe 524 and the pump 525 and is then supplied to the second container 521.

The circulation of the second liquid 120 may be controlled by, for example, the pump 525. That is, the pump 525 appropriately starts the supply of the second liquid 120, or stops the supply, or controls, for example, the amount of the second liquid 120 to be supplied.

Alternatively, the circulation of the second liquid 120 may be controlled by a means (e.g., valve) other than the pump 525.

In FIG. 4, the first electrode 210 is denoted as the negative electrode and the second electrode 220 is denoted as the positive electrode, as an example.

Herein, the first electrode 210 can be a positive electrode by using an electrode with a relatively low potential as the second electrode 220.

That is, the first electrode 210 may be a positive electrode and the second electrode 220 may be a negative electrode.

The electrolytic solutions (solvents) on the negative electrode chamber 610 side and on the positive electrode chamber 620 side separated by the isolation unit 400 may have different compositions.

Alternatively, the electrolytic solutions (solvents) on the negative electrode chamber 610 side and on the positive electrode chamber 620 side may have the same composition.

EXAMPLES

Examples of using the flow battery of the present disclosure will now be described.

Figure 5:
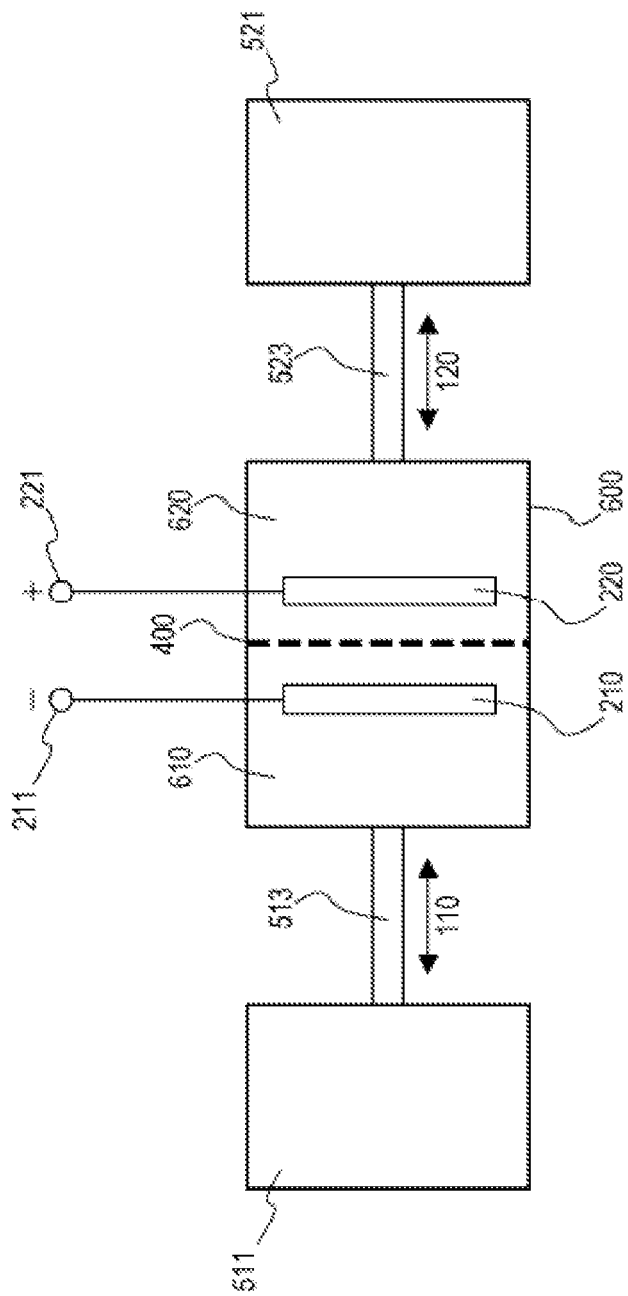
FIG. 5 is a diagram illustrating the schematic constitution of a flow battery of an example.

FIG. 5 is a diagram illustrating the schematic constitution of a flow battery of an example.

An H-type evaluation cell as shown in FIG. 5 was assembled.

Stainless steel was used as the first electrode 210 (negative electrode current collector) and the second electrode 220 (positive electrode current collector).

As the isolation unit 400, a diaphragm (manufactured by Toyoshima MFG Co., Ltd., diameter: 10 mm, thickness: 0.5 mm) made of an LLZ sintered compact (i.e., a sintered compact of a solid electrolyte having a composition represented by $Li_7La_3Zr_2O_{12}$) was used.

As the first liquid 110 (negative electrode solution), a DME solution containing 1 MIL phenanthrene serving as the first condensed aromatic compound 111 was used.

As the second liquid 120 (positive electrode solution), a DME solution containing 1 MIL benzophenone serving as the second condensed aromatic compound 121 was used.

The following charge and discharge test was performed using the evaluation cell prepared above.

The evaluation cell immediately after the assembly was in a charged state. Accordingly, discharge was started first.

The initial discharge capacitance was 1.98 μAh (discharge voltage: 0.8 V).

The cell was then charged at a charge voltage of 1.5V. The charge capacitance was 1.38 μAh.

As a result, the second discharge capacitance was 1.38 μAh (discharge voltage: 0.75 V).

The results above demonstrated that the flow battery of the present disclosure can be charged and discharged. The discharge voltage also agreed with the results of the potential measurement.

Embodiment 3

Embodiment 3 will now be described. Explanation overlapping with Embodiment 1 or 2 is omitted as appropriate.

FIGS. 6 to 8 show the results of measurement of the potentials of condensed aromatic compounds.

Copper foil of 2 cm 2 cm in size was wrapped with a polypropylene microporous separator and was further wrapped with a large amount of lithium metal foil. Tabs were then attached to the copper foil and the lithium metal foil, and a laminate outer package was further attached thereto. 2-MeTHF in which a condensed aromatic compound was dissolved at the molar concentration (M) shown in FIGS. 6 to 8 was poured inside the laminate outer package, and the laminate outer package was then heat-sealed. As described above, a cell for potential measurement was produced for each condensed aromatic compound. FIGS. 6 to 8 show the potentials (V vs. Li/Li$^+$) measured based on the lithium metal for the cells for potential measurement. Although 2-MeTHF was used as the ether in this measurement, other ethers can be similarly used.

The flow battery of Embodiment 3 includes the following constitution in addition to the constitution of the flow battery of Embodiment 1 or 2.

That is, in the flow battery of Embodiment 3, the first condensed aromatic compound 111 is at least one selected from the group consisting of phenanthrene, biphenyl, O-terphenyl, 2,2'-bipyridyl, trans-stilbene, triphenylene, anthracene, acenaphthene, acenaphthylene, fluoranthene, 2,4'-bipyridyl, 2,3'-bipyridyl, cis-stilbene, propiophenone, butyrophenone, valerophenone, ethylenediamine, benzil, and tetraphenylcyclopentadienone.

The above-described constitution can achieve a first liquid 110 in which a first condensed aromatic compound 111 having potentially base properties was dissolved. More specifically, the first condensed aromatic compound 111 can have a relatively low equilibrium potential (vs. Li/Li$^+$). Consequently, a lower potential negative electrode of a flow battery can be realized. Thus, a flow battery having a high battery voltage (discharge voltage) can be realized.

In the flow battery of Embodiment 3, the second condensed aromatic compound 121 is at least one selected from the group consisting of benzophenone, 1,10-phenanthroline, 4,4'-bipyridyl, 3,3-bipyridyl, and acetophenone.

The above-described constitution can realize a second liquid 120 in which a second condensed aromatic compound 121 having potentially noble properties is dissolved. More specifically, the second condensed aromatic compound 121 can have a relatively high equilibrium potential (vs. Li/Li$^+$). Consequently, a flow battery having a higher potential positive electrode can be realized. Consequently, a flow battery having a high battery voltage (discharge voltage) can be realized.

Embodiment 4

Embodiment 4 will now be described. Explanation overlapping with any of Embodiments 1 to 3 is omitted as appropriate.

The flow battery of Embodiment 4 includes the following constitution in addition to the constitution of the flow battery of any of Embodiments 1 to 3.

That is, the flow battery of Embodiment 4 includes a first liquid 110, a first electrode 210, a second liquid 120, a second electrode 220, and an electrolyte salt.

The first liquid 110 contains the first condensed aromatic compound 111.

The first electrode 210 is immersed in the first liquid 110.

The second electrode 220 is a counter electrode of the first electrode 210 and is immersed in the second liquid 120.

The electrolyte salt is dissolved in at least one of the first liquid 110 and the second liquid 120.

The concentration of the electrolyte salt in the first liquid 110 is not higher than the concentration of the first condensed aromatic compound 111 in the first liquid 110.

The above-described constitution can realize a flow battery having a high energy density. That is, the equilibrium potential of the first condensed aromatic compound 111 can be further maintained by setting the concentration of the electrolyte salt in the first liquid 110 so as to be not higher than the concentration of the first condensed aromatic compound 111. In other words, the equilibrium potential of the first condensed aromatic compound 111 can be prevented from significantly increasing (an increase caused by the electrolyte salt). Consequently, the equilibrium potential of the first condensed aromatic compound 111 can be prevented from increasing to a level higher than the equilibrium potential of the second condensed aromatic compound 121.

In the above-described constitution, the electrolyte salt is dissolved in at least one of the first liquid 110 and the second liquid 120 to enhance the ion conductivity of the liquid.

In Embodiment 4, the concentration of the electrolyte salt in the first liquid 110 may be lower than that of the first condensed aromatic compound 111 in the first liquid 110.

The above-described constitution can further maintain the equilibrium potential of the first condensed aromatic compound 111. In other words, the equilibrium potential of the first condensed aromatic compound 111 can be prevented from significantly increasing (an increase caused by the electrolyte salt). As a result, a flow battery having a higher energy density can be realized.

The flow battery in Embodiment 4 may further include an isolation unit 400.

The isolation unit 400 separates the first electrode 210 and the first liquid 110 from the second electrode 220 and the second liquid 120.

On this occasion, the concentration of the electrolyte salt in the first liquid 110 may be lower than that of the electrolyte salt in the second liquid 120.

The above-described constitution can further maintain the equilibrium potential of the first condensed aromatic compound 111 (can further decrease the deviation in the equilibrium potential). Accordingly, a flow battery having a high battery voltage (discharge voltage) can be realized. In addition, the flow battery can have a high energy density.

In Embodiment 4, the electrolyte salt may be dissolved in the second liquid 120, In such a case, the electrolyte salt does not have to be dissolved in the first liquid 110. That is, the concentration of the electrolyte salt in the first liquid 110 may be 0 M.

The above-described constitution can further maintain the equilibrium potential of the first condensed aromatic compound 111 (can further decrease the deviation in the equilibrium potential). Accordingly, a flow battery having a higher battery voltage (discharge voltage) can be realized. In addition, the flow battery can have a higher energy density.

In Embodiment 4, the first electrode 210 may be a negative electrode and the second electrode 220 may be a positive electrode.

In Embodiment 4, the electrolyte salt may be a lithium salt. As the lithium salt, for example, $LiBF_4$, $LiSbF_6$, $LiAsF_6$, $LiCF_3SO_3$, $LiN(SO_2CF_3)_2$, $LiN(SO_2C_2F_5)_2$, $LiN(SO_2CF_3)(SO_2C_4F_9)$, $LiC(SO_2CF_3)_3$, or $LiN(SO_2F)_2$ can be used. These lithium salts may be used alone or as a mixture of two or more thereof as the electrolyte salt.

In Embodiment 4, the electrolyte salt may be at least one selected from the group consisting of $LiBF_4$, $LiN(SO_2CF_3)_2$, $LiN(SO_2F)_2$, and $LiCF_3SO_3$.

FIGS. 9 to 12 show the results of measurement of the potentials of biphenyl solutions.

Biphenyl as a condensed aromatic compound and an electrolyte salt were dissolved in a 2-methyl tetrahydrofuran (2-MeTHF) solution at molar concentrations (M) shown in FIGS. 9 to 12 to prepare each sample. The electrolyte salt in the samples shown in FIG. 9 was $LiBF_4$; the electrolyte salt in the samples shown FIG. 10 was $LiN(SO_2CF_3)_2$; the electrolyte salt in the samples shown in FIG. 11 was $LiN(SO_2F)_2$; and the electrolyte salt in the samples shown in FIG. 12 was $LiCF_3SO_3$. Cells for potential measurement were produced using these samples as the lithium-containing liquids, and the potential of each cell was measured. FIGS. 9 to 12 show the potentials (V vs. $Li/Li^+$) measured based on the lithium metal.

As shown in FIGS. 9 to 12, it was demonstrated that if the concentration of the electrolyte salt is higher than that of biphenyl, the equilibrium potential of biphenyl against the metal lithium potential increases with the concentration of the electrolyte salt.

It was also demonstrated that if the concentration of the electrolyte salt is not higher than that of biphenyl, the equilibrium potential of biphenyl is prevented from significantly increasing. For example, if the concentration of the electrolyte salt is not higher than that of biphenyl, the equilibrium potential of biphenyl can be maintained at 0.2 V vs. $Li/Li^+$ or less.

FIG. 13 shows the results of measurement of the potentials of trans-stilbene solutions.

Trans-stilbene as a condensed aromatic compound and $LiBF_4$ as an electrolyte salt were dissolved in a 2-methyl tetrahydrofuran (2-MeTHF) solution at molar concentrations (M) shown in FIG. 13 to prepare each sample. Cells for potential measurement were produced using these samples as the lithium-containing liquids, and the potential of each cell was measured. FIG. 13 shows the potentials (V vs. $Li/Li^+$) measured based on the lithium metal.

As shown in FIG. 13, it was demonstrated that if the concentration of the electrolyte salt is higher than that of trans-stilbene, the equilibrium potential of trans-stilbene against the metal lithium potential increases with the concentration of the electrolyte salt.

It was also demonstrated that if the concentration of the electrolyte salt is not higher than that of trans-stilbene, the equilibrium potential of trans-stilbene is prevented from significantly increasing. For example, if the concentration of the electrolyte salt is not higher than that of trans-stilbene, the equilibrium potential of trans-stilbene can be maintained within a range of 0.2 to 0.6 V vs. $Li/Li^+$.

Embodiment 5

Embodiment 5 will now be described. Explanation overlapping with any of Embodiments 1 to 4 is omitted as appropriate.

The flow battery of Embodiment 5 includes the following constitution in addition to the constitution of the flow battery of any of Embodiments 1 to 3.

That is, in the flow battery of Embodiment 5, the first condensed aromatic compound 111 and an electrolyte salt are dissolved in the first liquid 110.

The electrolyte salt dissolved in the first liquid 110 is $LiPF_6$.

The above-described constitution can achieve a flow battery having a high energy density. That is, use of $LiPF_6$ as the electrolyte salt in the first liquid 110 can maintain the equilibrium potential of the first condensed aromatic compound 111 even if the concentration of the electrolyte salt is arbitrarily set relative to the concentration of the first condensed aromatic compound 111. In other words, the ion conductivity can be improved by addition of a sufficient amount of $LiPF_6$, while the equilibrium potential of the first condensed aromatic compound 111 being prevented from significantly increasing (an increase caused by the electrolyte salt). Consequently, the ion conductivity is increased, and the equilibrium potential of the first condensed aromatic compound 111 can also be prevented from increasing to a level higher than the equilibrium potential of the second condensed aromatic compound 121.

The flow battery of Embodiment 5 may further include a second liquid 120 and a second electrode 220.

The second electrode 220 is a counter electrode of the first electrode 210 and is immersed in the second liquid 120.

In this case, $LiPF_6$ as the electrolyte salt may be dissolved in the second liquid 120.

In the above-described constitution, $LiPF_6$ as the electrolyte salt is dissolved in at least one of the first liquid 110 and the second liquid 120 to enhance the ion conductivity of the liquid.

The flow battery of Embodiment 5 may further include an isolation unit 400. The isolation unit 400 separates the first electrode 210 and the first liquid 110 from the second electrode 220 and the second liquid 120.

In the above-described constitution, the equilibrium potential of the first condensed aromatic compound 111 can be further maintained (can further decrease the deviation in the equilibrium potential). Accordingly, a flow battery having a higher battery voltage (discharge voltage) can be realized. In addition, the flow battery can have a higher energy density.

In Embodiment 5, the first electrode 210 may be a negative electrode and the second electrode 220 may be a positive electrode.

FIG. 14 shows the results of measurement of the potentials of biphenyl solutions.

Biphenyl as a condensed aromatic compound and $LiPF_6$ as an electrolyte salt were dissolved in a 2-methyl tetrahydrofuran (2-MeTHF) solution at molar concentrations (M) shown in FIG. 14 to prepare each sample. Cells for potential measurement were produced using these samples as the lithium-containing liquids, and the potential of each cell was measured. FIG. 14 shows the potentials (V vs. $Li/Li^+$) measured based on the lithium metal. As shown in FIG. 14, even if the concentration of the electrolyte salt $LiPF_6$ is higher than (and also lower than) that of the biphenyl, the equilibrium potential of biphenyl relative to the potential of metal lithium can be maintained at a level of 0.2 V vs. $Li/Li^+$ or less.

FIG. 15 shows the results of measurement of the potentials of trans-stilbene solutions.

Trans-stilbene as a condensed aromatic compound and $LiPF_6$ as an electrolyte salt were dissolved in a 2-methyl tetrahydrofuran (2-MeTHF) solution at molar concentrations (M) shown in FIG. 15 to prepare each sample. Cells for potential measurement were produced using these samples as the lithium-containing liquids, and the potential of each cell was measured. FIG. 15 shows the potentials (V vs. $Li/Li^+$) measured based on the lithium metal. As shown in FIG. 15, even if the concentration of the electrolyte salt $LiPF_6$ is higher than (and also lower than) that of the trans-stilbene, the equilibrium potential of trans-stilbene relative to the potential of metal lithium can be maintained at a level of about 0.3 V vs. Li/Li+.

Embodiment 6

Embodiment 6 will now be described. Explanation overlapping with any of Embodiments 1 to 5 is omitted as appropriate.

The flow battery of Embodiment 6 includes the following constitution in addition to the constitution of the flow battery of any of Embodiments 1 to 5.

That is, in the flow battery of Embodiment 6, the first liquid 110 is prepared by dissolving a condensed aromatic compound (first condensed aromatic compound 111) in at least one selected from the group consisting of tetrahydrofuran, 2-methyl tetrahydrofuran, 1,2-dimethoxyethane, 2,5-dimethyl tetrahydrofuran, diethoxyethane, dibutoxyethane, diethylene glycol dimethyl ether, triethylene glycol dimethyl ether, tetraethylene glycol dimethyl ether, 3-methylsulfolane, and tetrahydrofurfurylamine.

The above-described constitution can achieve a first liquid 110 that has a function of stabilizing the solvated electrons paired with the condensed aromatic compound and emitted from lithium and can dissolve lithium (e.g., lithium metal).

FIG. 16 shows samples of the first liquid.

Biphenyl as the condensed aromatic compound was dissolved in each sample (solvent) shown in FIG. 16 at a concentration of 0.1 M to prepare each solution. A piece of lithium metal was put in each solution. The solutions were left to stand, and the solubility of the lithium metal was then visually verified.

The colorless solution changes color if the lithium metal transfers solvated electrons to the solution and is dissolved as lithium ions. Accordingly, the dissolution of lithium metal can be judged by disappearance of the lithium metal.

In FIG. 16, "O" denotes a sample showed dissolution of lithium metal; and "X" denotes a sample showed no dissolution of lithium metal.

FIG. 17 shows other samples of the first liquid.

Each sample shown in FIG. 17 is a mixture of solvent X and solvent Y at a volume mixing ratio shown in FIG. 17.

The samples shown in FIG. 17 were also subjected to the same experiment as that for the samples shown in FIG. 16, and the dissolution of lithium metal was verified.

As shown in FIG. 16, lithium metal was not dissolved in dibutoxymethane, anisole, and phenetole when they were used alone. However, as shown in FIG. 17, lithium metal was dissolved in dibutoxymethane, anisole, and phenetole when they were used as a mixture with dibutoxyethane.

It was thus demonstrated that coexistence of a solvent having lithium metal-dissolving ability can impart the lithium metal-dissolving ability to a solvent not having such ability.

In the flow battery of Embodiment 6, the second liquid 120 may be a solution prepared by dissolving a condensed aromatic compound (second condensed aromatic compound 121) in at least one selected from the group consisting of tetrahydrofuran, 2-methyl tetrahydrofuran, 1,2-dimethoxyethane, 2,5-dimethyl tetrahydrofuran, diethoxyethane, dibutoxyethane, diethylene glycol dimethyl ether, triethylene glycol dimethyl ether, tetraethylene glycol dimethyl ether, 3-methylsulfolane, and tetrahydrofurfurylamine.

The above-described constitution can achieve a second liquid 120 that has a function of stabilizing the solvated electrons paired with the condensed aromatic compound and emitted from lithium and can dissolve lithium (e.g., lithium metal).

The constitution described in Embodiments 1 to 6 may be appropriately combined to each other.

The flow battery of the present disclosure can be suitably used as, for example, an electric storage device.

What is claimed is:
1. A flow battery comprising:
  a first liquid;
  a second liquid;
  a first compound dissolved in the first liquid;
  a first electrode immersed in the first liquid;
  a second electrode being a counter electrode of the first electrode and immersed in the second liquid; and
  an isolation unit separating the first electrode and the first liquid from the second electrode and the second liquid, wherein
  lithium is dissolved in at least one of the first liquid and the second liquid; and
  the first compound is at least one selected from the group consisting of O-terphenyl, trans-stilbene, cis-stilbene, propiophenone, butyrophenone, valerophenone, and benzil.
2. The flow battery according to claim 1, wherein
  the isolation unit includes a diaphragm of a lithium-ion conductive solid electrolyte; and
  the diaphragm of the solid electrolyte is of a sintered compact of a solid electrolyte having a composition represented by $Li_7La_3Zr_2O_{12}$.
3. The flow battery according to claim 1, wherein
  an electrolyte salt is dissolved in the first liquid; and
  the electrolyte salt is $LiPF_6$.
4. The flow battery according to claim 1, wherein
  the first liquid contains at least one selected from the group consisting of tetrahydrofuran, 2-methyl tetrahydrofuran, 1,2-dimethoxyethane, 2,5-dimethyl tetrahydrofuran, diethoxyethane, dibutoxyethane, diethylene glycol dimethyl ether, triethylene glycol dimethyl ether, tetraethylene glycol dimethyl ether, 3-methylsulfolane, and tetrahydrofurfurylamine.
5. The flow battery according to claim 1, further comprising:
  a first circulation mechanism including a first container, wherein
  the first liquid is contained in the first container; and
  the first circulation mechanism circulates the first liquid between the first electrode and the first container.
6. The flow battery according to claim 1, further comprising:
  a second compound dissolved in the second liquid, wherein
  the first compound is O-terphenyl; and
  the second compound is at least one selected from the group consisting of 1,10-phenanthroline, 4,4'-bipyridyl, 3,3'-bipyridyl, and acetophenone.
7. The flow battery according to claim 1, further comprising:
  a second compound dissolved in the second liquid, wherein
  the first compound is trans-stilbene; and
  the second compound is at least one selected from the group consisting of 1,10-phenanthroline, 4,4'-bipyridyl, 3,3'-bipyridyl, and acetophenone.
8. The flow battery according to claim 1, further comprising:

a second compound dissolved in the second liquid, wherein
the first compound is cis-stilbene; and
the second compound is at least one selected from the group consisting of 1,10-phenanthroline, 4,4'-bipyridyl, 3,3'-bipyridyl, and acetophenone.

9. The flow battery according to claim 1, further comprising:
a second compound dissolved in the second liquid, wherein
the first compound is propiophenone; and
the second compound is at least one selected from the group consisting of 1,10-phenanthroline, 4,4'-bipyridyl, 3,3'-bipyridyl, and acetophenone.

10. The flow battery according to claim 1, further comprising:
a second compound dissolved in the second liquid, wherein
the first compound is butyrophenone; and
the second compound is at least one selected from the group consisting of 1,10-phenanthroline, 4,4'-bipyridyl, 3,3'-bipyridyl, and acetophenone.

11. The flow battery according to claim 1, further comprising:
a second compound dissolved in the second liquid, wherein
the first compound is valerophenone; and
the second compound is at least one selected from the group consisting of 1,10-phenanthroline, 4,4'-bipyridyl, 3,3'-bipyridyl, and acetophenone.

12. The flow battery according to claim 1, further comprising:
a second compound dissolved in the second liquid, wherein
the first compound is benzil; and
the second compound is at least one selected from the group consisting of 1,10-phenanthroline, 4,4'-bipyridyl, 3,3'-bipyridyl, and acetophenone.

13. The flow battery according to claim 1, wherein
a first condensed aromatic compound is dissolved in the first liquid; and
the first liquid containing the first condensed aromatic compound has a property of emitting a solvated electron of the lithium and dissolving the lithium as a cation.

14. The flow battery according to claim 13, wherein
the first condensed aromatic compound is reduced on the first electrode during charging; and
the first condensed aromatic compound is oxidized on the first electrode during discharging.

15. The flow battery according to claim 1, wherein
a second compound is dissolved in the second liquid; and
the second liquid containing the second compound has a property of emitting a solvated electron of the lithium and dissolving the lithium as a cation.

16. The flow battery according to claim 15, wherein
the second compound is oxidized on the second electrode during charging; and
the second compound is reduced on the second electrode during discharging.

17. The flow battery according to claim 15, wherein
the second compound is at least one selected from the group consisting of benzophenone, 1,10-phenanthroline, 4,4'-bipyridyl, 3,3'-bipyridyl, and acetophenone.

18. The flow battery according to claim 15, wherein
the second liquid contains at least one selected from the group consisting of tetrahydrofuran, 2-methyl tetrahydrofuran, 1,2-dimethoxyethane, 2,5-dimethyl tetrahydrofuran, diethoxyethane, dibutoxyethane, diethylene glycol dimethyl ether, triethylene glycol dimethyl ether, tetraethylene glycol dimethyl ether, 3-methylsulfolane, and tetrahydrofurfurylamine.

19. The flow battery according to claim 15, further comprising:
a second circulation mechanism including a second container, wherein
the second liquid is contained in the second container; and
the second circulation mechanism circulates the second liquid between the second electrode and the second container.

20. The flow battery according to claim 1, further comprising:
an electrolyte salt, wherein
the electrolyte salt is dissolved in at least one of the first liquid and the second liquid; and
the first liquid contains the electrolyte salt at a concentration not higher than that of the first compound in the first liquid.

21. The flow battery according to claim 20, wherein
the electrolyte salt is at least one selected from the group consisting of $LiBF_4$, $LiN(SO_2CF_3)_2$, $LiN(SO_2F)_2$, and $LiCF_3SO_3$.

22. The flow battery according to claim 20, wherein
the concentration of the electrolyte salt in the first liquid is lower than that of the electrolyte salt in the second liquid.

23. The flow battery according to claim 22, wherein
the electrolyte salt is dissolved in the second liquid and is not dissolved in the first liquid.

* * * * *